Dec. 1, 1953  J. LATZEN  2,660,901
RESILIENT STEERING LINKAGE CONNECTION
Filed Aug. 15, 1950

INVENTOR
JOSEF LATZEN
BY *Robert H. Jacob*
AGENT

Patented Dec. 1, 1953

2,660,901

UNITED STATES PATENT OFFICE 2,660,901

RESILIENT STEERING LINKAGE CONNECTION

Josef Latzen, Dusseldorf-Oberkassel, Germany, assignor to A. Ehrenreich & Cie., Dusseldorf-Oberkassel, Germany, a firm Application August 15, 1950, Serial No. 179,539

2 Claims. (Cl. 74—470)

My invention relates to steering lever joint devices for the steering linkage of steering gears, especially for motor vehicles.

Object of the present invention is to provide an improved steering lever joint device keeping shocks and vibrations coming from the wheels away from the steering lever and thus away from the steering rod as well as from the steering wheel, too, without impairing the steering.

In prior art motor vehicle steering devices the shocks and vibrations of the wheels are transmitted by the steering lever to the steering rod and to the steering wheel in a disadvantageous manner. Moreover the wear of the steering gear is considerably increased by shocks and vibrations.

According to the present invention the steering lever joint device avoids the aforesaid disadvantages by providing a shock damping intermediate member interjacent the steering lever and the steering rod. The damping intermediate member is preferably formed by a rubber sleeve the inner face of which encloses one of the parts to be connected whereas its outer circumferential surface is engaged with the other part to be connected. Such rubber bodies having any substantial flexibility in axial direction absorb shocks and vibrations, however, if strained by shear. Moreover production as well as mounting of a damping intermediate member is easy.

Other advantages obtained will be disclosed hereinafter.

By way of example, the structural features of the steering lever joint device redesigned according to this invention are set forth in the following specification and will be better understood by practitioners from the accompanying drawings, in which.

Similar letters refer to similar parts throughout the several views.

Figure 1:
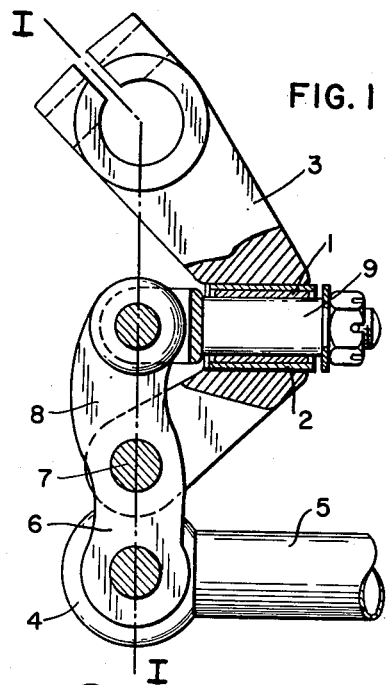
Fig. 1 is an elevation of a steering lever joint device, partly in section.
Figure 2:
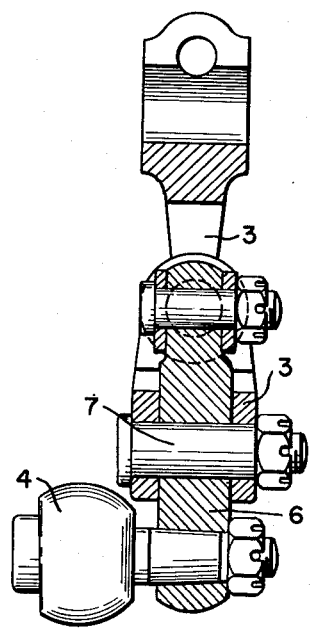
Fig. 2 is a section on line I—I of Fig. 1.

Referring now to the drawings the shock damping intermediate member consists of a rubber sleeve 1 enclosing a metal bushing 2 which is mounted within a steering lever 3.

According to the embodiments shown in the Fig. 1, 2, 4, and 5 the rubber sleeve 1 encloses a bolt 9 linked to a extension 8 of a joint lever 6 forming a part of a joint 4 being connected with a steering rod 5. The steering lever 3 is linked to the joint lever 6 by a pivot 7. If the steering rod 5 gets a shock shifting it to the right or to the left side the joint lever 6 swings around the pivot 7 in the corresponding direction. This swinging motion is transmitted by the extension 8 to the damping intermediate member which absorbs the motion elastically without any reaction to the steering lever 3.

Figure 4:
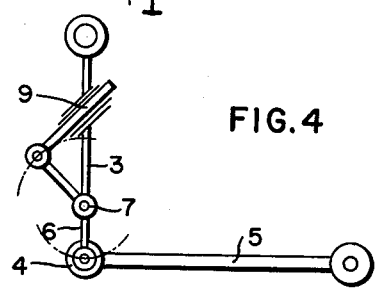
Fig. 4 is a diagrammatical view of the steering lever joint device shown in Fig. 1.
Figure 5:
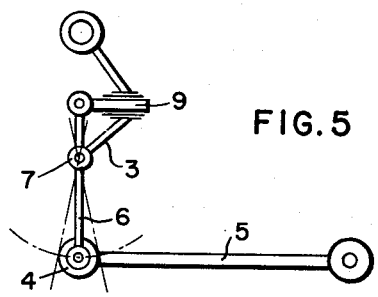
Fig. 5 shows diagrammatically a modified embodiment of the steering lever joint device shown in Fig. 4.

The modified embodiment of the steering lever joint device according to Fig. 5 differs from the embodiment shown in Fig. 4 only by a longer joint lever 6 and a shorter extension 8, thus effecting that shocks are transmitted to the damping intermediate member with a smaller amplitude.

Figure 6:
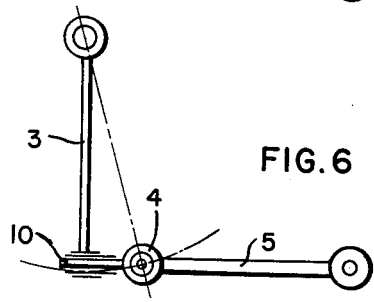
Fig. 6 is a diagrammatical view of the steering lever joint device shown in Fig. 3.
Figure 7:
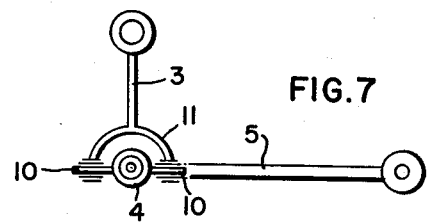
Fig. 7 shows diagrammatically a modified embodiment of the steering lever joint device.
Figure 3:
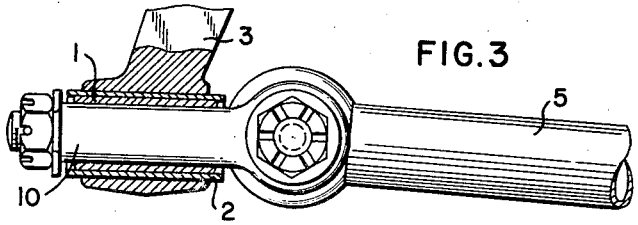
Fig. 3 is an elevation of another embodiment, partly in section.

As seen in the Fig. 3, 6, and 7 the damping intermediate member forms the direct connection of the steering lever 3 with a joint lever 10 of the joint 4. The shocks of the steering rod 5 acting as shearing strains are absorbed by the rubber sleeve 1.

According to the embodiment shown in Fig. 7, which is especially suitable for heavy trucks, the joint lever 10 is provided with two arms. The steering lever 3 has a fork 11 each leg of which is connected by means of a damping intermediate member with one arm each of the joint lever 10.

Various structural changes and modifications may be made in steering lever joint devices for the steering linkage of steering gears, especially for motor vehicles redesigned as shown and described, without departing from the spirit and the salient ideas of this invention.

What I claim is:

1. A steering mechanism for a motor vehicle which includes a steering lever and a steering rod, and buffer means arranged intermediate said steering lever and said steering rod comprising thrust absorbing telescoping members having a rubber sleeve disposed intermediate the opposing surfaces thereof, wherein the linkage between the steering rod joint and the steering lever is by way of a member in the form of a double armed lever having one arm pivotally connected to said steering rod joint, the other arm in yielding engagement with said steering lever by way of said rubber sleeve member, and wherein a portion intermediate said arms is connected to an end of said steering lever.

2. A steering mechanism for a motor vehicle which includes a steering lever, a steering rod, and buffer means comprising thrust absorbing telescoping members disposed between said steering lever and said steering rod, wherein the linkage between the steering rod and the steering lever is by way of a member in the form of a double armed lever having one arm pivotally connected to said steering rod, the other arm in yielding engagement with said steering lever by way of said thrust absorbing telescoping members, and wherein a portion intermediate said arms is connected to an end of said steering lever.

JOSEF LATZEN.

References Cited in the file of this patent

UNITED STATES PATENTS

| Number | Name | Date |
|---|---|---|
| 1,778,197 | Lord | Oct. 14, 1930 |
| 1,846,263 | Kull et al. | Feb. 23, 1932 |
| 2,227,521 | Utz | Jan. 7, 1941 |
| 2,541,827 | Mosso | Feb. 13, 1951 |

FOREIGN PATENTS

| Number | Country | Date |
|---|---|---|
| 697,872 | Germany | Oct. 25, 1940 |